US008219284B2

(12) United States Patent
Shinmura et al.

(10) Patent No.: US 8,219,284 B2
(45) Date of Patent: Jul. 10, 2012

(54) STEERING CONTROL APPARATUS, STEERING CONTROL SYSTEM, AND STEERING CONTROL PROGRAM

(75) Inventors: Koichi Shinmura, Saitama (JP); Sadachika Tsuzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 634 days.

(21) Appl. No.: 11/889,009

(22) Filed: Aug. 8, 2007

(65) Prior Publication Data
US 2008/0208412 A1 Aug. 28, 2008

(30) Foreign Application Priority Data

Aug. 9, 2006 (JP) ................................. 2006-216412

(51) Int. Cl.
*A01B 69/00* (2006.01)
(52) U.S. Cl. ................ 701/42; 701/22; 701/41; 701/43; 701/44; 180/402; 180/403; 180/444; 180/445; 180/446; 180/447; 180/448; 180/449; 33/203
(58) Field of Classification Search .................... 701/41, 701/42
See application file for complete search history.

(56) References Cited

U.S. PATENT DOCUMENTS

| 5,058,016 | A | * | 10/1991 | Davidovitch | ..................... | 701/22 |
| 5,253,728 | A | * | 10/1993 | Matsuno et al. | ................ | 180/446 |
| 5,291,660 | A | * | 3/1994 | Koerner | ...................... | 33/203.12 |
| 5,364,113 | A | * | 11/1994 | Goertzen | ...................... | 280/81.6 |
| 6,370,460 | B1 | * | 4/2002 | Kaufmann et al. | .............. | 701/41 |
| 6,799,104 | B2 | * | 9/2004 | Yao et al. | ........................ | 701/41 |
| 2004/0138796 | A1 | * | 7/2004 | Yao et al. | ......................... | 701/41 |
| 2004/0140145 | A1 | * | 7/2004 | Chernoff et al. | ............... | 180/333 |
| 2005/0056471 | A1 | * | 3/2005 | Kurata | ........................ | 180/65.5 |
| 2008/0208412 | A1 | * | 8/2008 | Shinmura et al. | ................ | 701/42 |

FOREIGN PATENT DOCUMENTS

| EP | 0315 210 A1 | 5/1989 |
| JP | 61-108677 | 7/1986 |
| JP | 62-139814 | 9/1987 |
| JP | H03-038280 | 4/1991 |
| JP | 07-125643 | 5/1995 |
| JP | 11-334559 | 12/1999 |
| JP | 2000-190863 | 7/2000 |
| JP | 2006-187047 | 7/2006 |

OTHER PUBLICATIONS

Japanese Office Action dated May 23, 2011 corresponding to Japanese Application No. P2006-216412.
Notification of Reasons for Refusal in related JP Application No. 2006-216412 dated Jan. 24, 2011.

* cited by examiner

*Primary Examiner* — Redhwan K Mawari
(74) *Attorney, Agent, or Firm* — Squire Sanders (US) LLP

(57) ABSTRACT

The present invention provides a steering control apparatus that controls steering of a vehicle of a steer-by-wire type, and includes steered-wheel motors that apply separate torques to right and left steered wheels respectively, a rod member that couples the right and left steered wheels so that the steered wheels can be steered, and a steering controller that controls driving of the steered-wheel motors. In each steered wheel, a center of the contact face thereof and a kingpin point thereof are offset in a lateral direction of the vehicle, and the steering controller controls driving of the steered-wheel motors so as to generate a torque difference between the right and left steered wheels, and provides a steering effort in accordance with this torque difference for each of the right and left steered wheels via the rod member, thereby to steer the vehicle.

9 Claims, 11 Drawing Sheets

FIG.4A
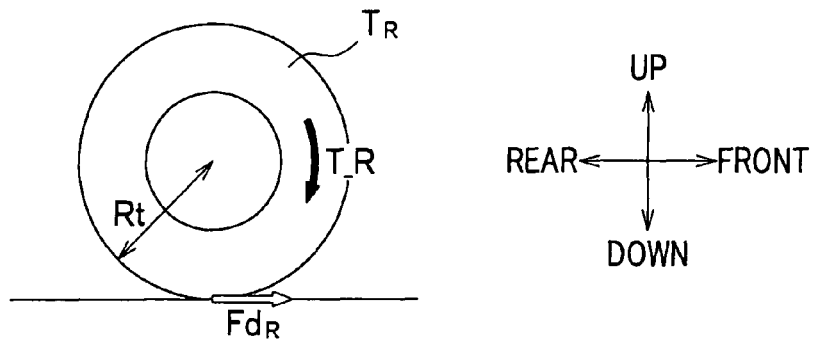
FIG.4B
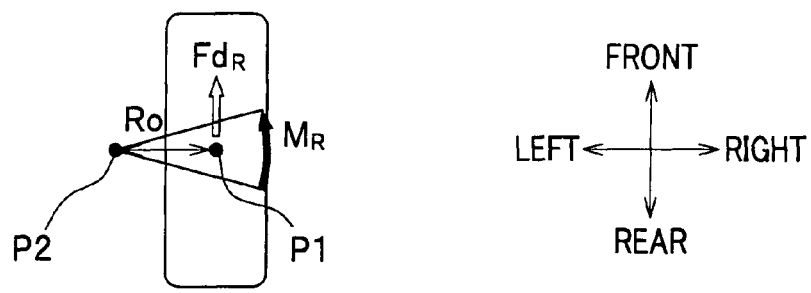
FIG.4C
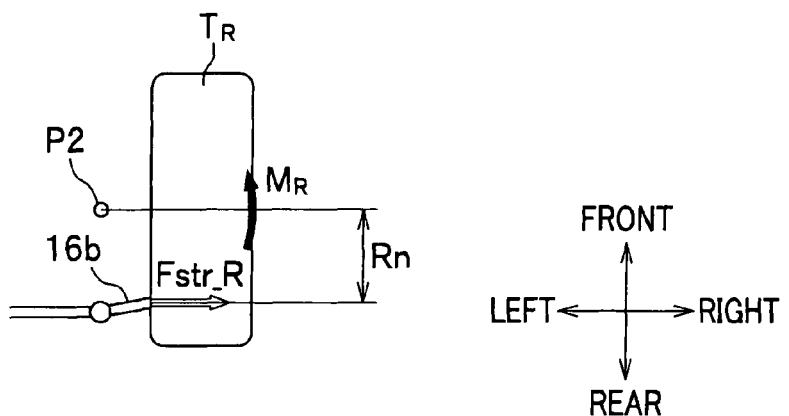
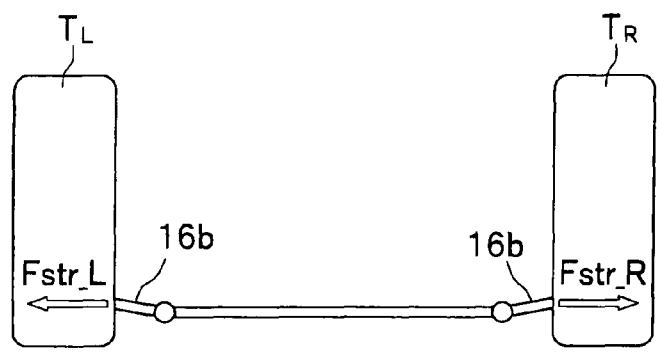

STEERING CONTROL APPARATUS, STEERING CONTROL SYSTEM, AND STEERING CONTROL PROGRAM

CROSS-REFERENCE TO RELATED APPLICATION

This application claims the foreign priority benefit under 35 U.S.C. §119 of Japanese Patent Application No. 2006-216412 filed on Aug. 9, 2006, the disclosure of which is incorporated herein by reference.

BACKGROUND OF THE INVENTION

1. Field of the Invention

The present invention relates to a steering control apparatus, a steering control system and a steering control program for controlling a steering angle of a vehicle, particularly to those for controlling a steering angle of a vehicle in which a steer-by-wire is employed and a torque is separately provided for each steered wheel.

2. Description of the Related Art

As disclosed in JPA H07-125643, there has been known a "steer-by-wire (SBW)" in which a mechanical connection between a steering wheel and steered wheels of a vehicle is eliminated. In a vehicle employing the SBW technique, a sensor detects steering amount of a steering wheel, based on which steered wheels are steered by using a motor or motors, or by using a hydraulic mechanism.

In such a conventional technique, an actuator dedicated to steering (also referred to as a "steering actuator") such as a motor or a hydraulic mechanism is required as a power source for steering the steered wheels. Consequently, spare space for other components of the vehicle is restricted so that a steering-relevant design is constrained.

Therefore, in the light of such a disadvantage, it has been target to provide a steering control apparatus, a steering control system and a steering control program in the SBW scheme, which eliminates a steering actuator, thereby to enhance flexibility of the steering-relevant design.

SUMMARY OF THE INVENTION

In one aspect of the present invention, there is provided a steering control apparatus that controls steering of a vehicle of a steer-by-wire type includes steered-wheel motors that apply separate torques to right and left steered wheels respectively, a rod member that couples the right and left steered wheels so that the steered wheels can be steered, and a steering controller that controls driving of the steered-wheel motors. In each steered wheel, a center of the contact face thereof and a corresponding kingpin point thereof are offset in a lateral direction of the vehicle, and the steering controller controls driving of the steered-wheel motors so as to generate a torque difference between the right and left steered wheels, and provides a steering effort in accordance with the torque difference for each of the right and left steered wheels via the rod member, thereby to steer the vehicle.

In another aspect of the present invention, there is provided a steering control system that controls steering of a steer-by-wire type vehicle and has steered-wheel motors that apply separate torques to the right and left steered wheels respectively, in each of which a center of the contact face thereof and a kingpin point thereof are offset in a lateral direction of the vehicle. The system includes a target steering angle setting unit for setting a target steering angle based on steering amount of the vehicle, a target torque difference setting unit for setting a target torque difference between the right and left steered wheels based on the target steering angle, a target driving/braking force setting unit for setting a target driving/braking force for the vehicle based on acceleration amount and braking amount for the vehicle, a target torque setting unit for setting each target torque for the right and left steered wheels based on the target torque difference and the target driving/braking force, and a motor driving unit for controlling driving of steered-wheel motors based on the target torques.

Further more, in another aspect of the present invention, there is provided a storage medium storing a computer-readable program that executes a computer to serve as various functional units, in order to control steering of a steer-by-wire type vehicle having steered-wheel motors that apply separate torques to the right and left steered wheels respectively, in each of which a center of the contact face thereof and a kingpin point thereof are offset in a lateral direction of the vehicle. The various functional units includes a target steering angle setting unit for setting a target steering angle for a vehicle based on steering amount of the vehicle, a target torque difference setting unit for setting a target torque difference between right and left steered wheels based on the target steering angle, a target driving/braking force setting unit for setting a target driving/braking force for the vehicle based on acceleration amount and braking amount of the vehicle, a target torque setting unit for setting each target torque for the right and left steered wheels based on the target torque difference and the target driving/braking force, and a motor driving unit for controlling driving of steered-wheel motors based on the target torque.

Other features and advantages of the present invention will become more apparent from the following detailed description of the invention when taken in conjunction with the accompanying exemplary drawings.

BRIEF DESCRIPTION OF THE DRAWINGS

FIGS. 4A to 4C are views for explaining steering of the steered wheels by utilizing the kingpin offset.

FIG. 5A shows that the kingpin offset is zero, and FIG. 5B shows that the kingpin offset is not zero.

DETAILED DESCRIPTION OF THE PREFERRED EMBODIMENTS

The principle of the present invention is that a center of the contact face and a kingpin point are intentionally offset in a lateral direction (width direction) of a vehicle, and the vehicle is controlled in its steering angle by utilizing this kingpin offset.

With reference to attached drawings, there will be provided descriptions on embodiments of the present invention, hereinafter. Same numeral references will be given to same or similar components, and duplicated descriptions will be omitted. Right-left symmetric components will be provided with numeral references of "R" and "L" respectively, if necessary.

First Embodiment

Figure 1:
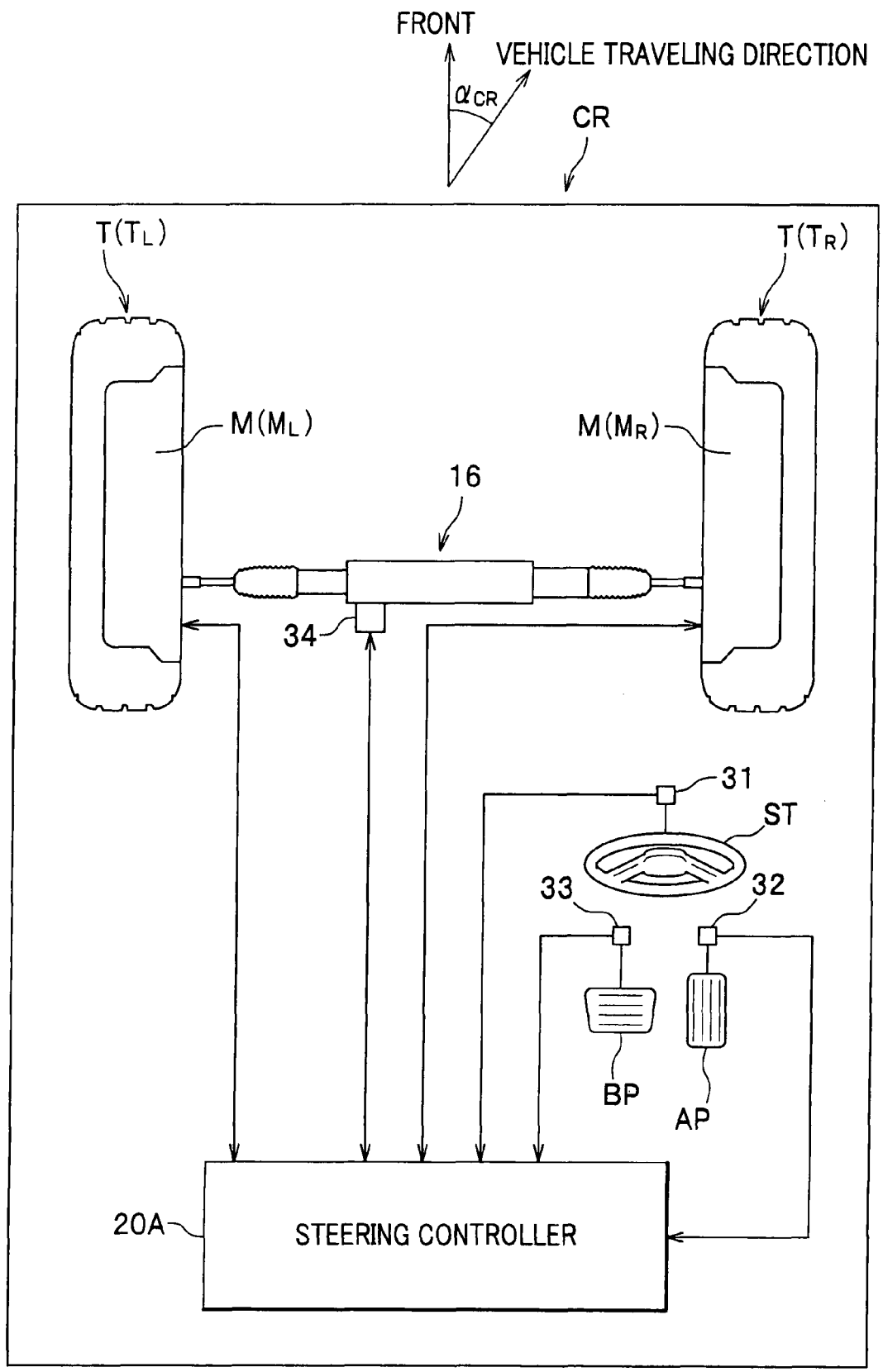
FIG. 1 is a schematic diagram of a vehicle for which a steering control apparatus according to a first embodiment is provided.
Figure 2:
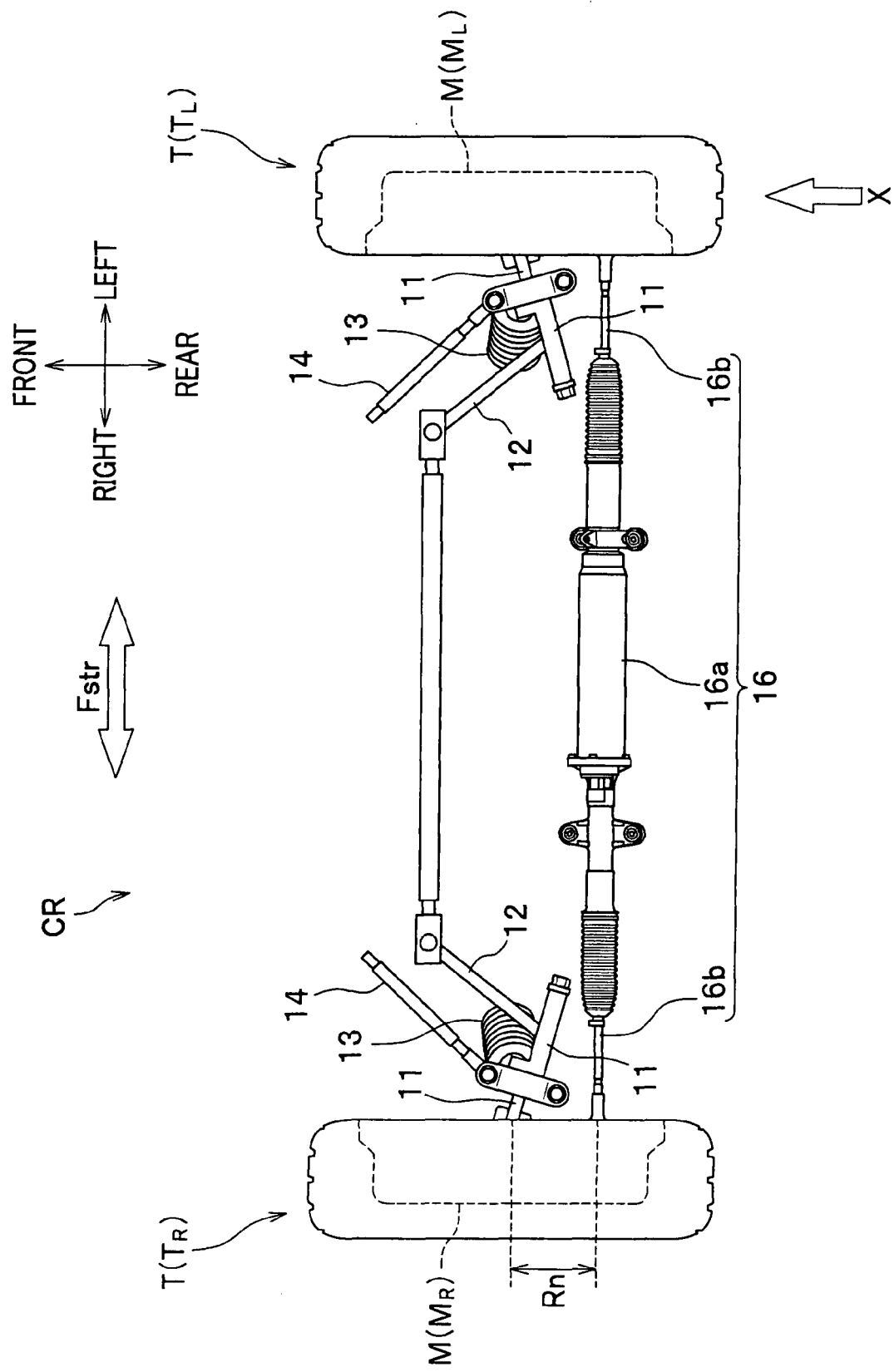
FIG. 2 is a view for explaining a structure in vicinity of steered wheels of the vehicle for which the steering controller according to the first embodiment is provided, in which the steered wheels are seen upward from a contact point side thereof.

FIG. 1 is a schematic diagram of a vehicle for which a steering control apparatus according to a first embodiment is provided. FIG. 2 is a view for explaining a structure in vicinity of steered wheels of the vehicle for which the steering controller according to the first embodiment is provided, in which the steered wheels are seen upward from a contact point side thereof.

Figure 3:
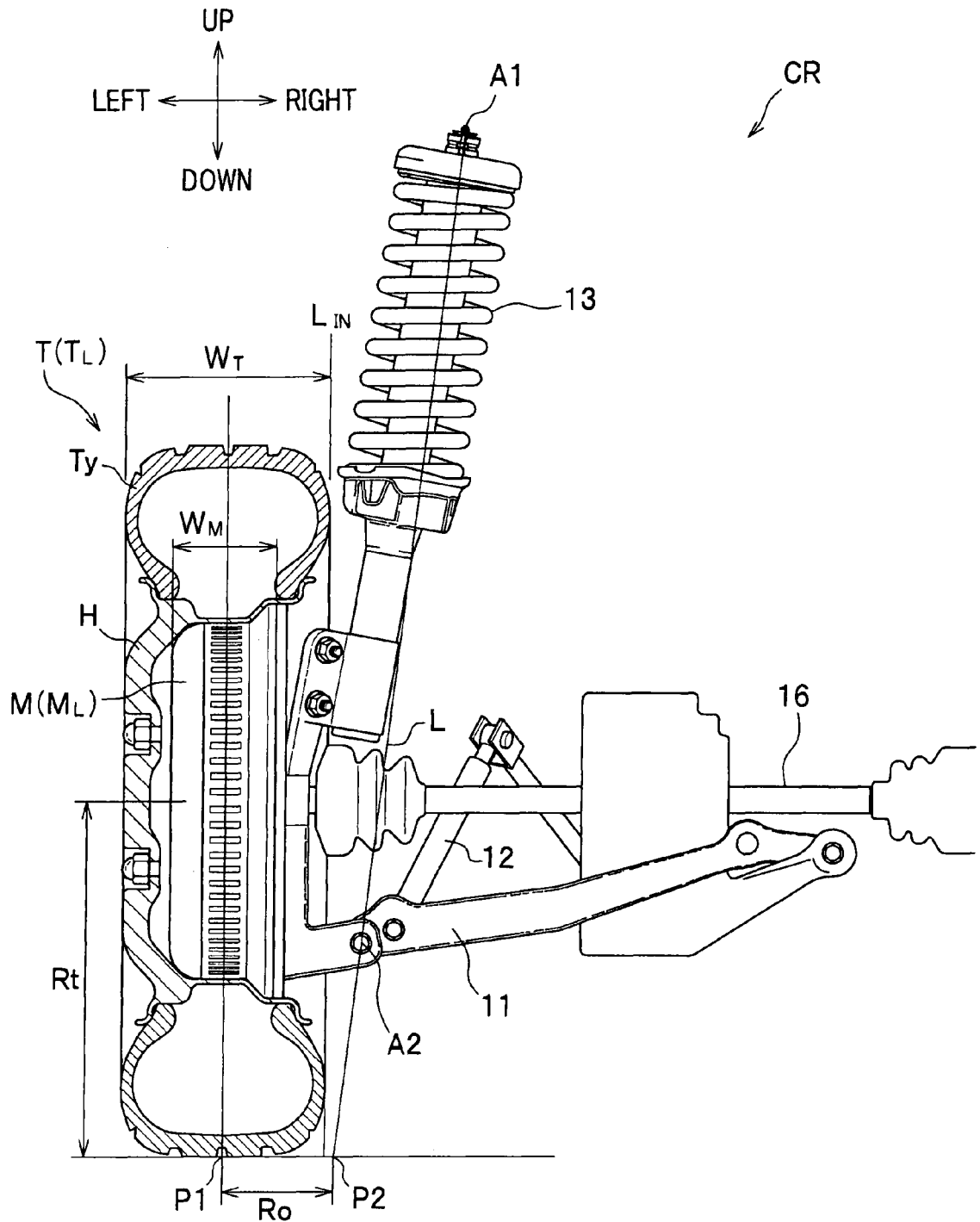
FIG. 3 is a view on an arrow X, which is seen in a direction from a rear side toward a front side of the vehicle.
Figure 5A:
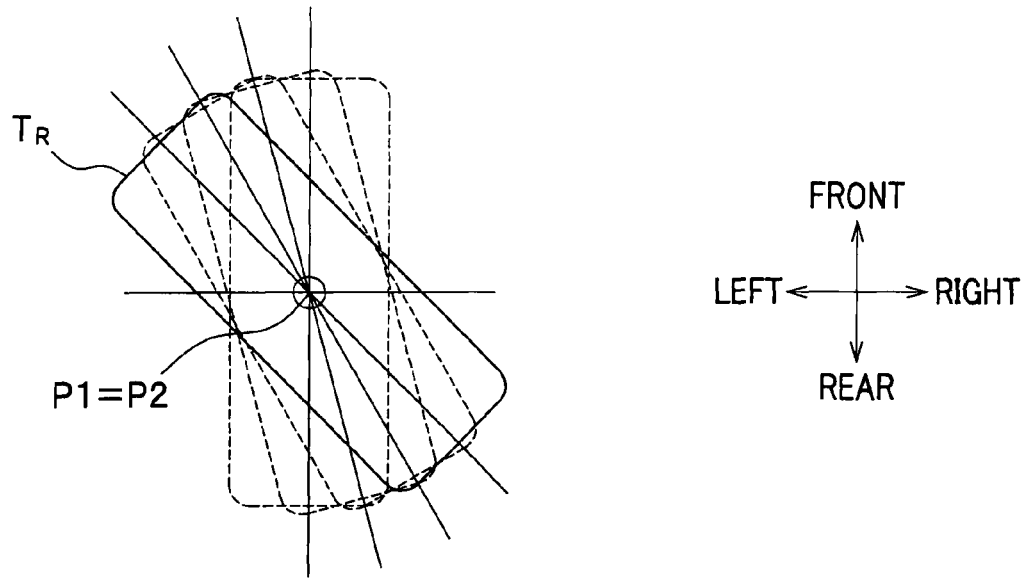
FIGS. 5A and 5B are further views for explaining steering of the steered wheels by utilizing the kingpin offset.
Figure 5B:
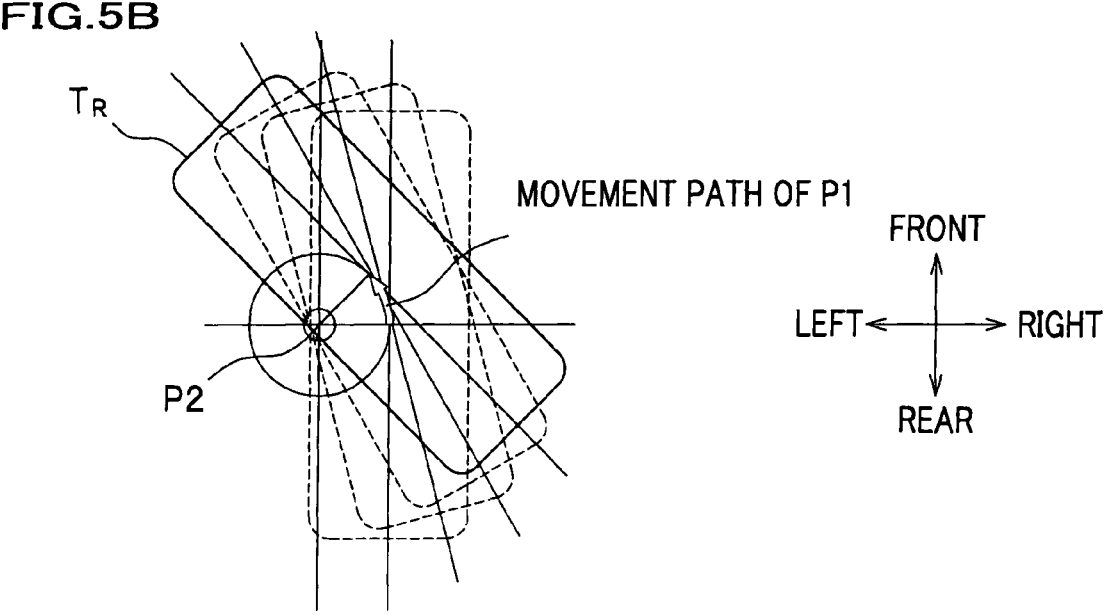
Figure 6:
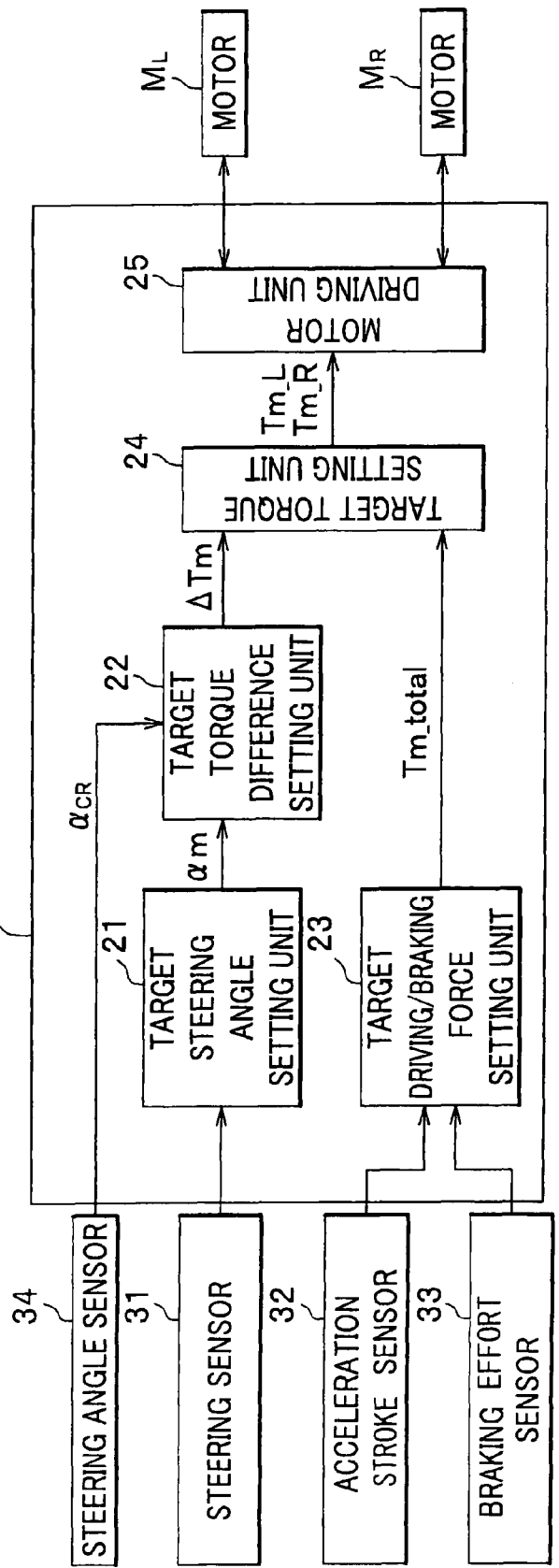
FIG. 6 is a block diagram showing a steering controller according to the first embodiment.

FIG. 3 is a view on an arrow X, which is seen in a direction from a rear side toward a front side of the vehicle. FIG. 4 are views for explaining steering of the steered wheels by utilizing the kingpin offset. FIG. 5 are further views for explaining steering of the steered wheels by utilizing the kingpin offset, in which FIG. 5A shows that the kingpin offset is zero; and FIG. 5B shows that the kingpin offset is not zero. FIG. 6 is a block diagram showing a steering controller according to the first embodiment. It should be noted that FIGS. 4 and 5 are schematic diagrams in which the kingpin offset is emphasized and tie rods 16a, 16b are simplified.

As shown in FIG. 1, the steering control apparatus according to the first embodiment is an apparatus for controlling steering of the vehicle CR of steer-by-wire type, and includes motors $M_R$ and $M_L$ that provide separate torques for right and left steered wheels respectively; a rod member 16 that couples the right and left steered wheels $T_R$, $T_L$ so that the right and left steered wheels $T_R$, $T_L$ can be steered; and a steering controller (steering control system) 20A.

The steering controller 20A serves for controlling each torque for the right and left steered wheels $T_R$, $T_L$ of the vehicle CR, so as to realize a target driving/braking force and a target steering angle.

The steering controller 20A is connected with a steering sensor 31, an acceleration stroke sensor 32, a braking effort sensor 33 and a steering angle sensor 34.

The steering sensor 31 serves for detecting steering amount of a steering ST (also referred to as merely "steering amount") and a steering direction of the steering ST (also referred to as merely a "steering direction"). The acceleration stroke sensor 32 serves for detecting acceleration amount of an accelerator pedal AP (also referred to as merely "acceleration amount"). The braking effort sensor 33 serves for detecting braking amount of a braking pedal BP (also referred to as merely "braking amount"). The steering angle sensor 34 serves for detecting a steering angle $\alpha_{CR}$ of the vehicle CR.

Each result from the sensors 31 to 34 is output to the steering controller 20A.

The steering controller 20A includes, for example, CPU, RAM, ROM and I/O circuits and executes various controls (described later) by executing calculations based on each input from the sensors 31 to 34 and programs and data stored on the ROM.

[Kingpin Offset]

As shown in FIGS. 2 and 3, the steer-by wire technique is employed in the vehicle CR for which the steering control apparatus of the present invention is provided, and includes the motors $M_R$, $M_L$ respectively provided for the right and left steered wheels $T_R$, $T_L$. The motor M ($M_R$, $M_L$) is installed in the corresponding steered wheel T ($T_R$, $T_L$), so as to provide a separate torque for each steered wheel T (in-wheel-motor system). The motors $M_R$, $M_L$ are each exemplified as a steered-wheel motor.

The vehicle CR employs a strut suspension scheme, and each steered wheel T is provided with a stabilizer 12 via a lower arm 11, a shock absorber unit 13 and a radial rod 14.

The rod member 16 coupling the right and left steered wheels $T_R$, $T_L$ includes a central rod 16a and tie rods 16b, 16b that couple the central rod 16a with the steered wheels $T_R$, $T_L$ respectively.

Rn denotes a lower arm length (described later) which is a distance from each joint between the steered wheels $T_R$, $T_L$ and the respective tie rods 16b, 16b to the corresponding kingpin point P2 (described later) in the longitudinal direction of the vehicle CR.

In the vehicle CR in which such a strut suspension system is employed, a virtual kingpin axis L is defined by a straight line through a joint (upper mount portion) A1 at which the shock absorber unit 13 and a vehicle body of the vehicle CR are jointed and a joint (lower mount portion) A2 at which the motor M and the lower arm 11 are jointed.

The virtual kingpin axis L serves as a turning center axis when each steered wheel T turns.

A distance between a ground contact of a center line of the steered wheel T (i.e. center of the contact face of the steered wheel T) P1 and a ground contact of the virtual kingpin axis L (i.e. kingpin point) P2 in the lateral direction of the vehicle CR is referred to as a kingpin offset (or scrub radius) Ro in the descriptions of the present invention.

As shown in FIG. 5A, if the kingpin offset Ro is zero, the steered wheels $T_R$, $T_L$ turn about the center of the contact face P1 (=P2) thereof as a turning axis when being steered (only the right steered wheel $T_R$ is shown in FIG. 5A). Meanwhile, as shown in FIG. 5B, if the kingpin offset Ro is not zero, the steered wheels $T_R$, $T_L$ turn about the kingpin point P2 thereof as a turning axis when being steered, and the center of the contact face P1 moves (turns) in a circular arc with a radius of Ro (only the right steered wheel $T_R$ is shown in FIG. 5B). The present invention utilizes this turning movement of the center of the contact face P1 about the kingpin point P2 for steering the vehicle CR.

A conventional vehicle is designed to reduce this kingpin offset Ro as much as possible. To the contrary, the present invention encourages this kingpin offset Ro which is utilized in steering of the vehicle CR.

In this embodiment, as shown in FIG. 3, the steered-wheel motors $M_R$, $M_L$ are provided for the right and left steered wheels $T_R$, $T_L$ respectively. A distance (depth) WM of each motor $M_R$, $M_L$ of the steered wheels $T_R$, $T_L$ in the lateral direction of the vehicle CR is set to be smaller than a distance WT of each steered wheel $T_R$, $T_L$ on the right and left side in the lateral direction of the vehicle CR (only the components on the left side are shown in FIG. 3). The steered-wheel motors $M_R$, $M_L$ are completely housed in the steered wheels $T_R$, $T_L$, respectively, thereby to enhance flexibility of suspension geometry including the lower arm 11 and the shock absorber unit 13, etc., and to facilitate setting optimum offset variable of the kingpin point P2.

In particular in this embodiment, as shown in FIG. 3, each joint (lower mount portion A2) between the rod member 16 and the right and left steered wheels $T_R$, $T_L$ is provided more inward than each inner end $L_{IN}$ of the right and left steered wheels $T_R$, $T_L$ in the lateral (right and left) direction of the vehicle CR. Accordingly, it is possible to realize a greater kingpin offset than that of a conventional vehicle.

In addition, the shock absorber 13 and the lower arm 11 and the like are disposed such that the kingpin P2 is positioned closer to the vehicle CR side than from the inner end $L_{IN}$, so that an efficient steering effort can be generated. In other words, the kingpin point P2 is positioned closer to the vehicle on an inside portion of an inside sidewall of a steered wheel $L_{IN}$, as illustrated in FIG. 3.

In the present invention, the bigger the kingpin offset Ro becomes, the easier it becomes to generate a steering effort Fstr. Now, it should be noted that, if the kingpin offset Ro is set to be too great, movement of the tire Ty becomes too great when it is steered, which causes a disadvantage that the vehicle CR needs more housing space (tire house) for the tire Ty. In the light of this disadvantage, the kingpin offset Ro should be appropriately set in consideration of a body size, a tire radius Rt, a lower arm length Rn, and suspension geometry, etc., of the vehicle CR.

When the vehicle CR runs, the torques $T_{\_R}$, $T_{\_L}$ of the right and left steered wheels $T_R$, $T_L$ each serve as a reaction force between the road and each tire Ty, so as to generate driving forces $Fd_R$, $Fd_L$ (only the right steered wheel $T_R$ is shown in FIG. 4A). The driving forces $Fd_R$, $Fd_L$ are represented by the following formulas 1 and 2.

$$Fd_L = T_{\_L}/Rt \quad \text{[Formula 1]}$$

$$Fd_R = T_{\_R}/Rt \quad \text{[Formula 2]}$$

Where, Rt denotes a tire radius (radius of the tire Ty of the steered wheel T).

The driving forces $Fd_R$, $Fd_L$ work on each tire ground contact center P1, and generate moments $M_R$, $M_L$ that steer the steered wheels $T_R$, $T_L$, around the kingpin point P2, respectively (only the right steered wheel $T_R$ is shown in FIG. 4B). The moments $M_R$, $M_L$ are represented by the following formulas 3 and 4.

$$M_L = Fd_L \cdot Ro \quad \text{[Formula 3]}$$

$$M_R = Fd_R \cdot Ro \quad \text{[Formula 4]}$$

Where the right and left steered wheels $T_R$, $T_L$ have both an equal kingpin offset Ro.

The tie rods 16b, 16b are approximately vertical to the respective steered wheels $T_R$, $T_L$, and forces along the axis of the tie rods 16b, 16b (the rod member 16) caused by the respective moments $M_R$, $M_L$ denote as steering efforts $Fstr_{\_R}$, $Fstr_{\_L}$ respectively; this relation is represented by the following formulas 5 and 6 (in FIG. 4C, an upper view shows the steering effort $Fstr_{\_R}$ on the right steered wheel in details, and a lower view shows both the steering efforts $Fstr_{\_R}$ and $Fstr_{\_L}$ on the right and left steered wheels). It should be noted that each arrow of the steering efforts Fstr of FIG. 4C represents a forward direction thereof, for convenience.

$$M_L = Fstr_{\_L} \cdot Rn \quad \text{[Formula 5]}$$

$$M_R = Fstr_{\_R} \cdot Rn \quad \text{[Formula 6]}$$

Where, Rn denotes the lower arm length, which is a distance from a joint between each steered wheel T and the tie rod 16b to each kingpin point P2 in the longitudinal direction of the vehicle CR.

Through these formulas 1 to 6, a total steering effort Fstr acting on the rod member 16 is a force in a direction represented by a bold arrow Fstr of FIG. 2, and is expressed by the following formulas 7 and 8.

$$Fstr = \Delta T \times Ro/(Rn \times Rt) \quad \text{[Formula 7]}$$

$$\Delta T = T_{\_R} - T_{\_L} \quad \text{[Formula 8]}$$

Where, Ro denotes the kingpin offset, Rn denotes the lower arm length, Rt denotes a tire radius (radius of the tire Ty of the steered wheel T).

ΔT is a difference between the torque $T_{\_R}$ of the right steered wheel $T_R$ and the torque $T_{\_L}$ of the left steered wheel $T_L$. Herein, it is defined that the right direction of FIG. 3 becomes a forward direction of Fstr.

Specifically, if the driving/braking forces (i.e. torques) of the right and left steered wheels $T_R$, $T_L$ are both equivalent to each other, the steering efforts of the right and left steered wheels $T_R$, $T_L$ derived from the kingpin offset Ro are canceled by each other, so that there is generated no steering effort to the vehicle CR.

On the other hand, if the driving/braking forces (i.e. torques) of the right and left steered wheels $T_R$, $T_L$ are not equivalent to each other, there are generated a difference between steering efforts of the right and left steered wheels $T_R$, $T_L$. Accordingly, there is generated any steering effort to the vehicle CR.

Even a vehicle (steering control system) employing a suspension system other than such a strut suspension system also has a virtual kingpin axis. Therefore, a kingpin offset may be actively applied to such a vehicle, similar to this embodiment of the present invention.

[Steering Controller]

As shown in FIG. 6, the steering controller (also referred to as a "steering control system") 20A includes a target steering angle setting unit 21, a target torque difference setting unit 22, a target driving/braking force setting unit 23 and a target torque setting unit 24 and a motor driving unit 25, as various functional units.

The target steering angle setting unit 21 acquires steering amount and a steering direction detected by the steering sensor 31, and set a target steering angle αm based on the steering amount and the steering direction that have been acquired.

The target steering angle αm is a target value for a steering angle of the vehicle CR. This target steering angle αm may be set to have the same steering feeling of the steering actuator constituted of a conventional rack & pinion mechanism, hydraulic mechanism or the like. The target steering angle αm may also be set such that gain thereof is adjusted depending on the vehicle speed.

The target steering angle αm that has been set is output to the target torque difference setting unit 22.

The target torque difference setting unit 22 sets a target torque difference ΔTm based on the target steering angle αm and an actual steering angle $α_{CR}$ (see FIG. 1) detected by the steering angle sensor 34 such that the actual steering angle $α_{CR}$ agrees with the target steering angle αm. In this embodiment, the target torque difference setting unit 22 calculates the target torque difference ΔTm by a PI control using a difference Δα between the actual steering angle $α_{CR}$ and the target steering angle αm (=$α_{CR}$−αm).

A relation between the target torque difference ΔTm and the difference Δα is represented by the following formula 9.

$$\Delta Tm = kp \cdot \Delta\alpha + ki \int \Delta\alpha\, dt \qquad [\text{Formula 9}]$$

Where, kp denotes a proportional gain and ki denotes an integral gain, and these parameters are predefined based on results from a pretest or the like.

The target torque difference ΔTm represents a difference between target torques for the right and left steered wheels $T_R$, $T_L$ of the vehicle CR. This target torque difference ΔTm is represented by the following formula 10.

$$\Delta Tm = Tm\_R - Tm\_L \qquad [\text{Formula 10}]$$

The target torque difference ΔTm that has been set is output to the target torque setting unit 24.

The target torque difference ΔTm may be set by not only the PI control scheme but also other control schemes.

The target driving/braking force setting unit 23 sets a target driving/braking force Tm_total, based on the acceleration amount detected by the acceleration stroke sensor 32 and the braking amount detected by the braking effort sensor 33.

The target driving/braking force Tm_total is a target value for the driving/braking force (torque) of the vehicle RC.

The target driving/braking force Tm_total that has been set is output to the target torque setting unit 24.

The target torque setting unit 24 sets target torques Tm_R, Tm_L of the right and left steered wheels $T_R$, $T_L$.

The target torques Tm_R, Tm_L are a target value for each torque applied to the right and left steered wheels $T_R$, $T_L$. Where, with the target torque Tm_R for the right steered wheel $T_R$ and the target torque Tm_L for the left steered wheel $T_L$, the target torque difference ΔTm and the target driving/braking force Tm_total are represented by the following formulas 11 and 12 respectively.

$$\Delta Tm = Tm\_R - Tm\_L \qquad [\text{Formula 11}]$$

$$Tm\_\text{total} = Tm\_R + Tm\_L \qquad [\text{Formula 12}]$$

Therefore, the target torques Tm_R, Tm_L are represented by the following formulas 13 and 14 respectively.

$$Tm\_L = (Tm\_\text{total} - \Delta Tm)/2 \qquad [\text{Formula 13}]$$

$$Tm\_R = (Tm\_\text{total} + \Delta Tm)/2 \qquad [\text{Formula 14}]$$

The target torques Tm_R, Tm_L that have been set are input to the motor driving unit 25.

The motor driving unit 25 controls driving of the motors $M_R$ and $M_L$ based on the target torques Tm_R, Tm_L. The motor driving unit 25 provides a feedback control for the motors $M_R$, $M_L$ respectively such that a torque of the motor $M_R$ agrees with the target torque Tm_R and such that a torque of the motor $M_L$ agrees with the target torque Tm_L. In this embodiment, as the motors $M_R$, $M_L$, a three-phase brushless motor is employed, and the motor driving unit 25 performs a vector control based on a dq transformation. Accordingly, the driving force Tm_total and the steering angle $\alpha_{CR}$ that a driver of the vehicle CR desires are obtained at a time. In other words, a steering effort Fstr represented by the formula 7 is generated in response to an output command of generating ΔTm.

According to the steering control apparatus of the first embodiment, the vehicle CR can be controlled in steering without using a steering actuator. By adjusting the torques applied to the right and left steered wheels $T_R$, $T_L$, a target steering angle $\alpha_{CR}$ can be obtained. Accordingly, a steering actuator can be eliminated, thereby to enhance flexibility of steering-relevant design. In addition, since the steer-by-wire is employed, no mechanical connection between the steering ST and the steered wheels $T_R$, $T_L$ is required, thereby to highly enhance flexibility of vehicle design.

Second Embodiment

There will be provided descriptions on a vehicle in which a steering control apparatus according to a second embodiment of the present invention is incorporated, mainly on different features from those of the first embodiment of the present invention. Descriptions on the same or similar features and components of the first embodiment will be omitted.

Figure 7:
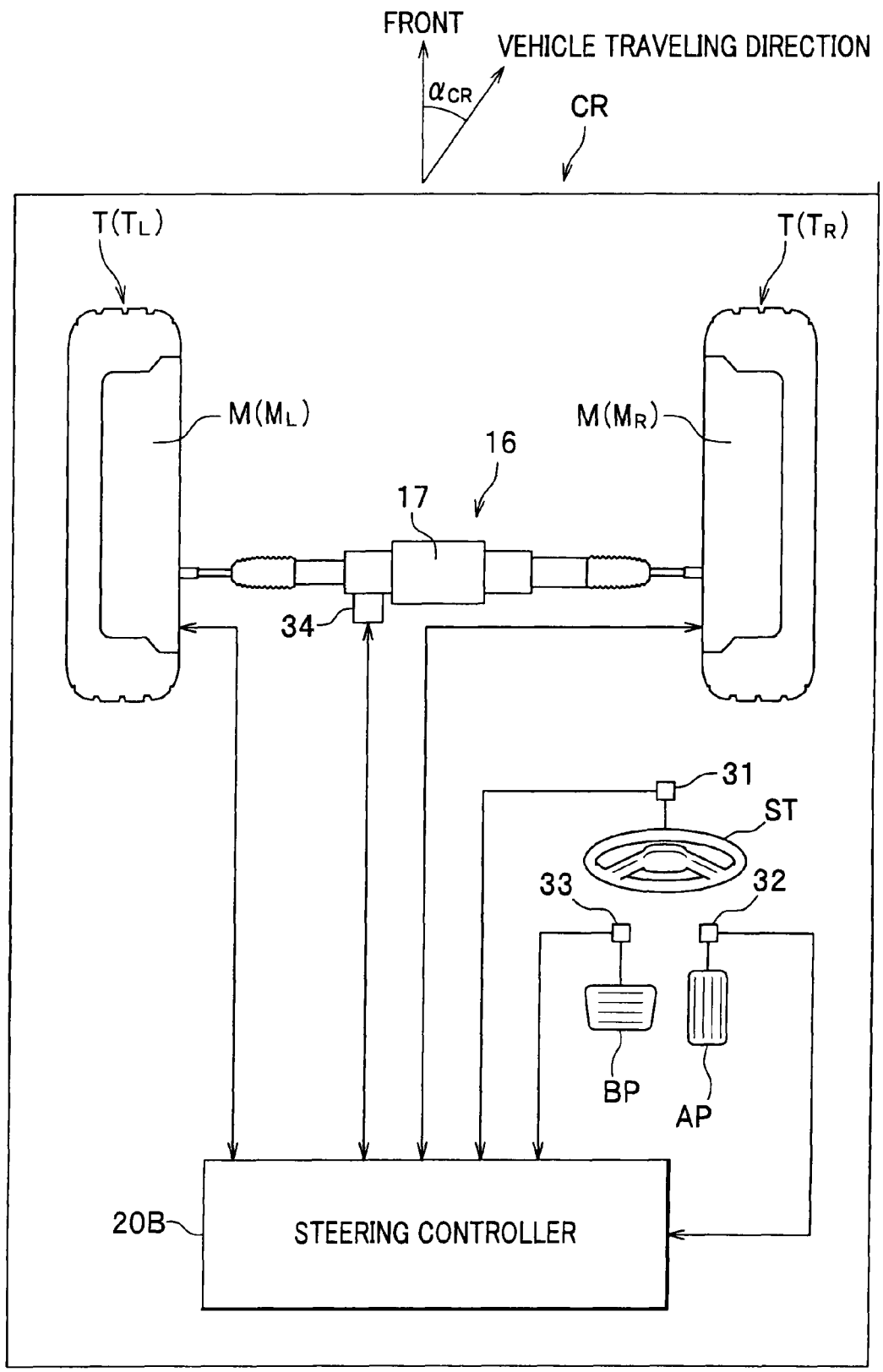
FIG. 7 is a schematic diagram showing a vehicle for which a steering control apparatus according to a second embodiment of the present invention is provided.

FIG. 7 is a schematic diagram showing a vehicle for which a steering control apparatus according to a second embodiment of the present invention is provided.

Figure 8:
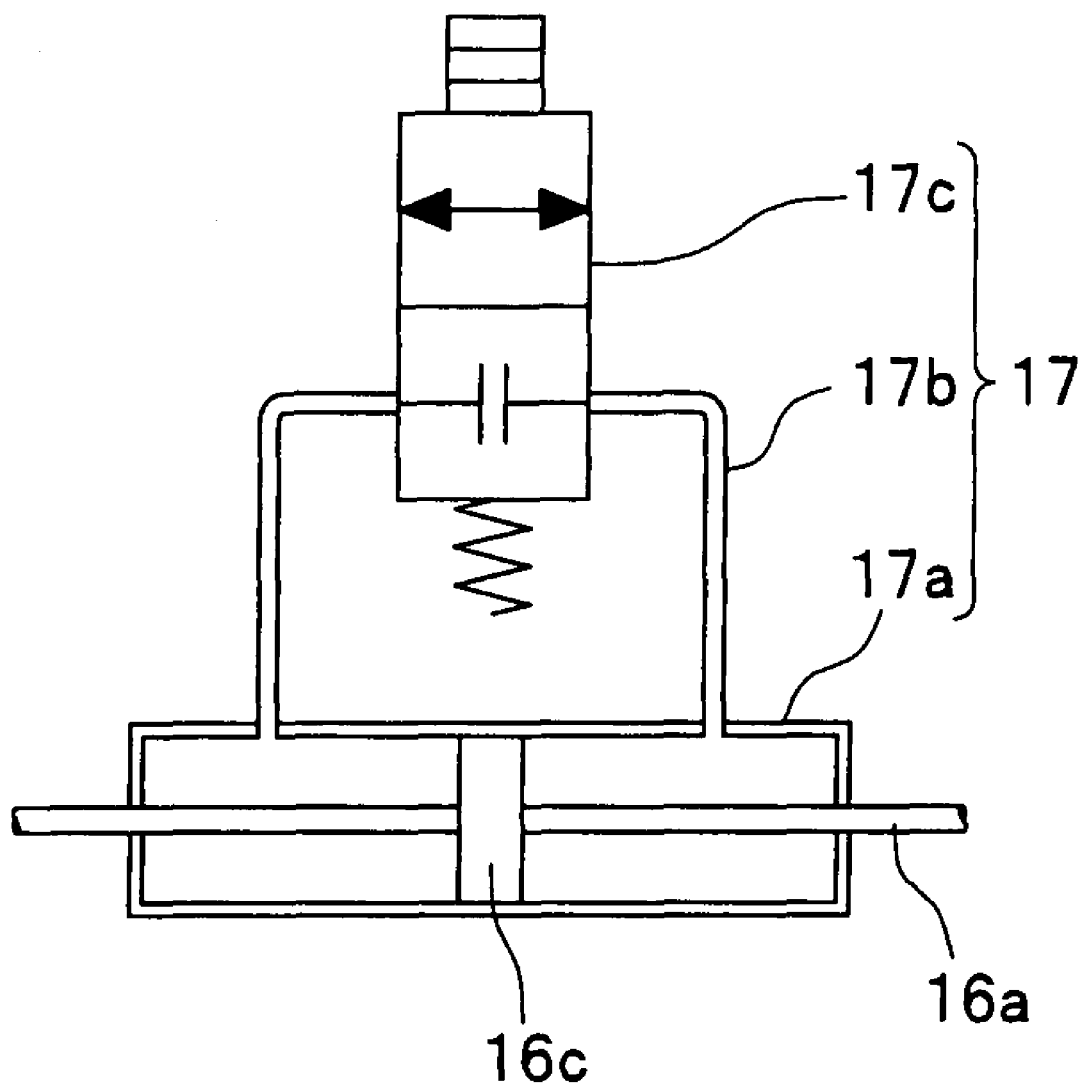
FIG. 8 is a schematic diagram for explaining a lock mechanism according to the second embodiment of the present invention.
Figure 9:
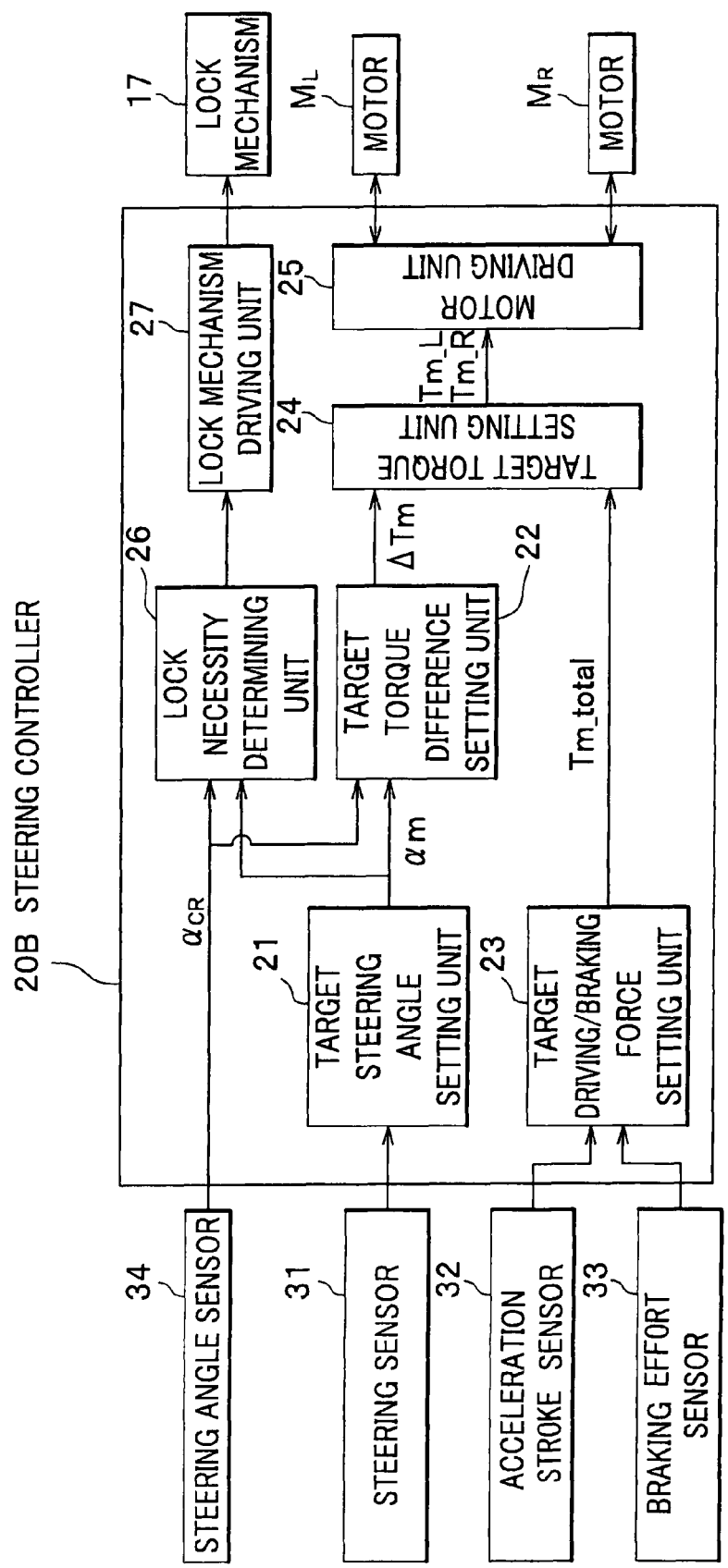
FIG. 9 is a block diagram showing a steering controller according to the second embodiment of the present invention.

FIG. 8 is a schematic diagram for explaining a lock mechanism according to the second embodiment of the present invention. FIG. 9 is a block diagram showing a steering controller according to the second embodiment of the present invention.

As shown in FIG. 7, the steering control apparatus according to the second embodiment further includes a steering controller (also referred to as a "steering control system") 20B, instead of the steering controller 20A in the first embodiment.

The steering control apparatus according to the second embodiment further includes the lock mechanism 17.

The locked mechanism 17 serves for locking the rod member 16 so as to fix the steering angle $\alpha_{CR}$, and is controlled in its driving by the steering controller 20B.

[Lock Mechanism]

As shown in FIG. 8, the lock mechanism 17 is a hydraulic cylinder mechanism in which a rod 16a serves as a piston rod, including a cylinder 17a divided into two partitions by a partition wall 16c of the rod 16a, a hydraulic passage 17b that connects the two separated partitions and an electromagnetic valve 17c provided in the hydraulic passage 17b.

The cylinder 17a and the hydraulic passage 17b are filled with oil, and the cylinder 17a is fixed to the vehicle body. The electromagnetic valve 17c is switchable between an open state and a close state thereof.

In the open state of the electromagnetic valve 17c, the oil flows between the two partitions of the cylinder 71a, so that the rod 16a can move laterally (in the right and left direction) and the steered wheels $T_R$, $T_L$ can be steered.

On the other hand, in the close state of the electromagnetic valve 17c, the oil cannot flow between the two partitions of the cylinder 71a, so that the steered wheels $T_R$, $T_L$ are locked.

Such a control by the electromagnetic valve 17c is executed by a lock mechanism driving unit 27 (described later).

[Steering Controller]

As shown in FIG. 9, the steering controller (steering control system) 20B according to the second embodiment further includes a lock necessity determining unit 26 and the lock mechanism driving unit 27, as the various function units.

According to the second embodiment, the target steering angle αm that has been set by the target steering angle setting unit 21 is also output to the lock necessity determining unit 26, and the steering angle $\alpha_{CR}$ of the vehicle CR that has been detected by the steering angle sensor 34 is output to the lock necessity determining unit 26, as well.

The lock necessity determining unit 26 determines whether or not the rod member 16 is required to be locked by the lock mechanism 17 based on a difference between the actual steering angle $\alpha_{CR}$ of the vehicle CR and the target steering angle αm. The lock necessity determining unit 26 determines that the rod member 16 is required to be locked if the difference Δα between the actual steering angle $\alpha_{CR}$ of the vehicle CR and the target steering angle αm (=α_{CR}−αm) is equal to a predetermined (threshold) value αTH or smaller.

This predetermined value αTH (also referred to as a "first predetermined value") is predetermined and presorted, and may be a constant value or a variable value varying in correlation with the vehicle speed.

A determined result from the lock necessity determining unit 26 is output to the lock mechanism driving unit 27.

The lock mechanism driving unit 27 controls driving of the lock mechanism 17 based on a determined result. If determining that the rod member 16 is required to be locked, the lock mechanism driving unit 27 controls the lock mechanism 17 to lock the rod 16a. If determining that the rod member 16 is not required to be locked, the lock mechanism driving unit 27 controls the lock mechanism 17 to unlock the rod 16a.

In the steering control apparatus according to the second embodiment, if there is no necessity of changing the steering angle $α_{CR}$ when the vehicle runs straight, for example, stability of the steered wheels $T_R$, $T_L$ can be enhanced.

In addition, according to the second embodiment of the present invention, in a case in which a relatively greater turning radius is required for the steered wheels $T_R$, $T_L$, a traveling direction of the vehicle body can be changed by utilizing a yaw moment due to a torque difference $ΔT$ between the right and left steered wheels $T_R$, $T_L$ even in the locked state of the rod member 16.

Third Embodiment

There will be provided descriptions on a vehicle in which a steering control apparatus according to a third embodiment of the present invention is incorporated, mainly on different features from those of the second embodiment of the present invention. Descriptions on the same or similar features and components of the first and second embodiments will be omitted.

Figure 10:
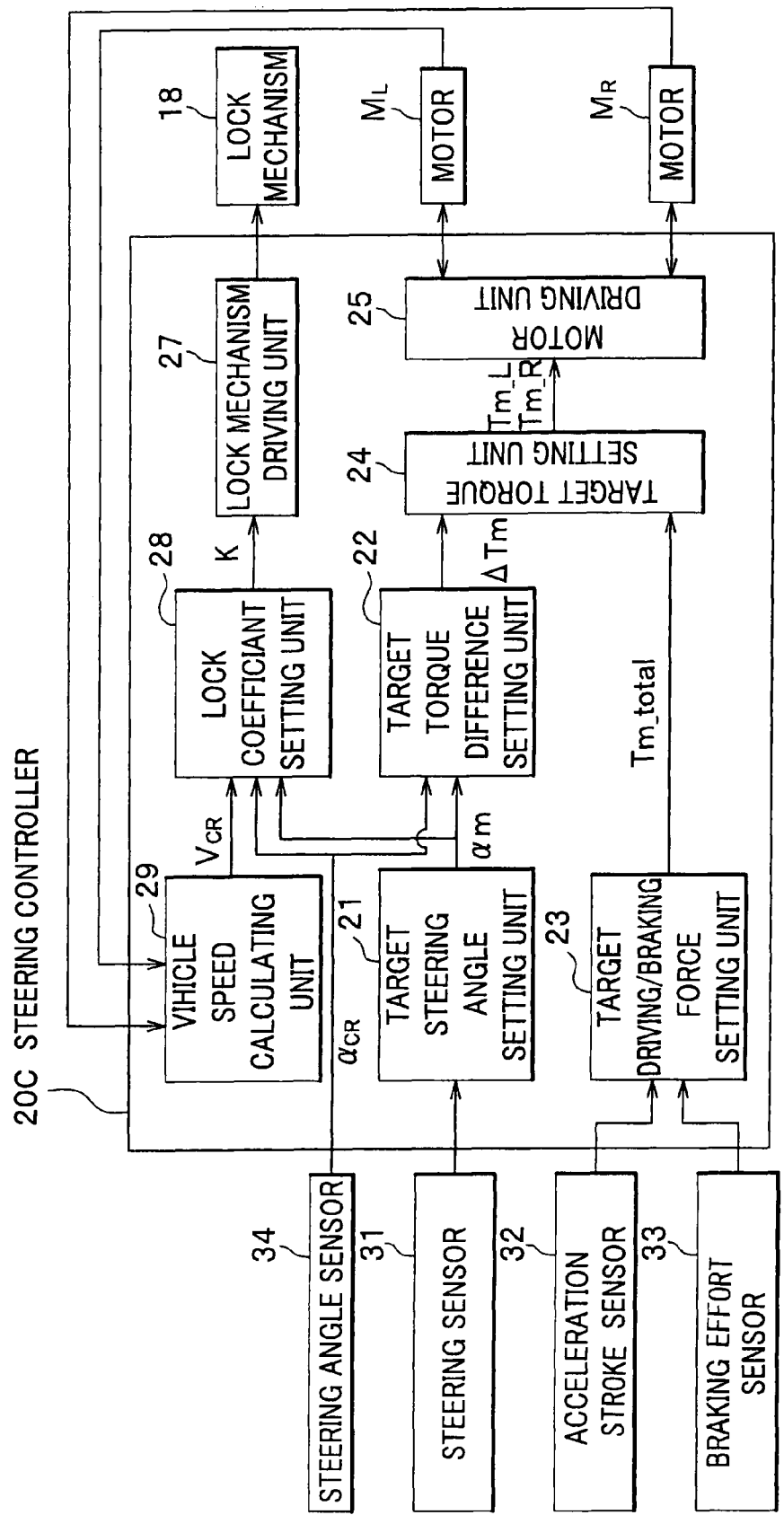
FIG. 10 is a block diagram showing a steering controller according to a third embodiment of the present invention.
Figure 11:
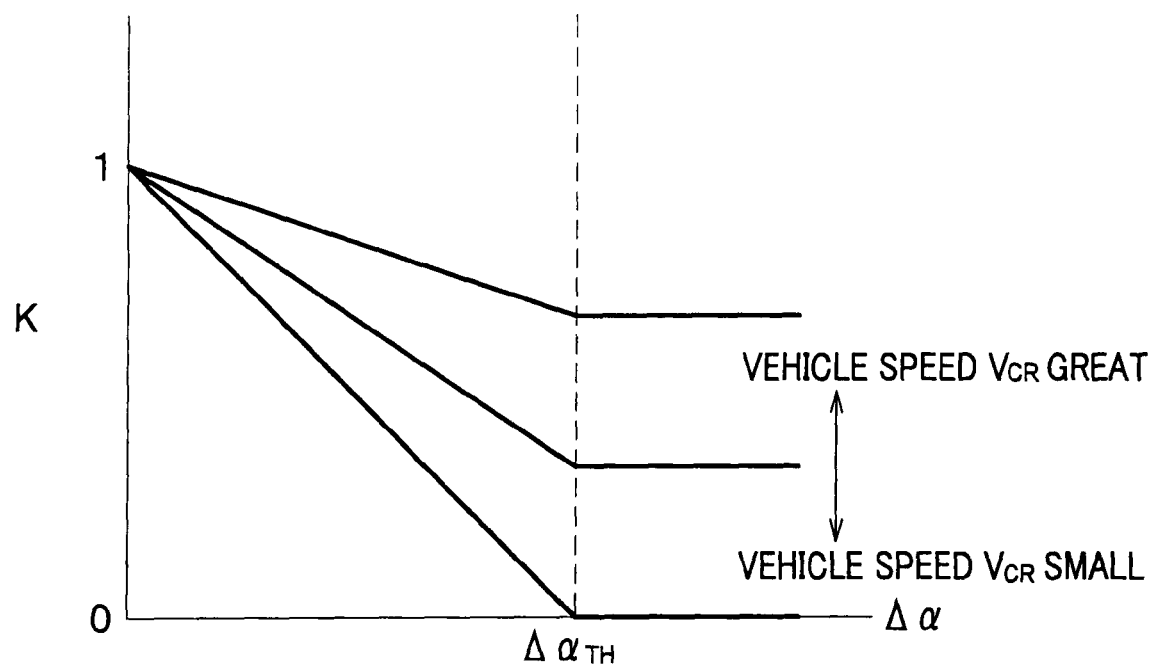
FIG. 11 is a lock coefficient map for selecting a lock coefficient.

FIG. 10 is a block diagram showing a steering controller according to the third embodiment of the present invention. FIG. 11 is a lock coefficient map for selecting a lock coefficient.

The steering control apparatus according to the third embodiment includes a lock mechanism 18 instead of the lock mechanism 17 of the second embodiment.

The lock mechanism 18 is designed to continuously or intermittently provide a locking force to lock the rod 16a.

The lock mechanism 18 can be realized by replacing the electromagnetic valve 17c of the lock mechanism 17 of the second embodiment with a liner solenoid valve. Therefore, descriptions on the lock mechanism 18 will be omitted.

[Steering Controller]

As shown in FIG. 10, the steering controller (also referred to as a "steering control system") 20C according to the third embodiment includes a lock coefficient setting unit 28 instead of the lock necessity determining unit 26. The steering controller 20C further includes a vehicle speed calculating unit 29.

In this embodiment, the target steering angle αm that has been set by the target steering angle setting unit 21 is output to the lock coefficient setting unit 28, and the steering angle $α_{CR}$ of the vehicle CR that has been detected by the steering angle sensor 34 is also output to the lock coefficient setting unit 28.

The vehicle speed calculating unit 29 calculates a vehicle speed $V_{CR}$ based on the torques of the motors $M_R$, $M_L$. The torques of the motors $M_R$, $M_L$ have a correlation with the wheel speed of the steered wheels $T_R$, $T_L$, respectively. Calculating the vehicle speed $V_{CR}$ based on speed of the driving wheels is a conventional method, and the vehicle speed calculating unit 29 may calculate the vehicle speed $V_{CR}$ by using such a conventional method.

The calculated vehicle speed $V_{CR}$ is output to the lock coefficient setting unit 28.

The lock coefficient setting unit 28 sets a lock coefficient K with reference to a lock coefficient map for selecting a lock coefficient, based on the vehicle speed $V_{CR}$, an actual steering angle $α_{CR}$ and a target steering angle αm.

The lock coefficient K that has been set is output to the lock mechanism driving unit 27.

The lock mechanism driving unit 27 controls driving of the lock mechanism 18 such that the lock coefficient K that has been set is achieved.

Now, more detailed descriptions will be given on the lock coefficient K. The lock coefficient setting unit 28 previously stores the lock coefficient map for selecting a lock coefficient of the FIG. 11, which represents a correlation of the difference $Δα$ between the actual steering angle $α_{CR}$ of the vehicle CR and the target steering angle αm (=$α_{CR}$−αm), the vehicle speed $V_{CR}$ and the lock coefficient K, as shown in FIG. 11.

The lock coefficient K is a value between 0 and 1, in which "K=0" denotes a completely unlocked state (a state in which a lock is completely released), and "K=1" denotes a completely locked state.

If such a lock coefficient K is used, the steering effort Fstr acting on the rod member 16 is represented by the following formula 15.

$$Fstr=(1−K)×ΔT×Ro/(Rn×Rt) \qquad \text{[Formula 15]}$$

Specifically, by setting an appropriate lock coefficient K, it is possible to continuously or intermittently control the relation between the torque difference $ΔT$ and the steering effort Fstr.

In the third embodiment, the lock coefficient K is set such that the greater the difference $Δα$ becomes, the smaller the lock coefficient K becomes; and the greater the vehicle speed $V_{CR}$ becomes, the greater the lock coefficient K becomes. In addition, when the difference $Δα$ is equal to a predetermined (threshold) value $ΔαTH$ (also referred to as a "second predetermined value") or greater, the lock coefficient K is set to become constant for each vehicle speed VC.

Therefore, in a lower speed driving ("vehicle speed $V_{CR}$ small" of FIG. 11), the vehicle body orientation can be changed with a smaller steering radius by a steering; and in a higher speed driving ("vehicle speed $V_{CR}$ great" of FIG. 11), the change of the vehicle body orientation by the steering can be restrained, so as to secure stability of the vehicle body, meanwhile the vehicle body orientation can be changed mainly by using a yaw moment due to the torque difference $ΔT$ between the right and left steered wheels $T_R$, $T_L$.

The lock coefficient map for selecting the lock coefficient K of FIG. 11 may be set appropriately, depending on output performance of the motor M, an operation feeling of the steering ST, and movement characteristics determined by a structure of the vehicle body CR, etc. If a significantly greater yaw moment can be set because of an output performance of the motor M, or if a stability of the vehicle body is attached more importance to, the lock coefficient map of FIG. 11 may be set such that each line has a more moderate inclination within a range of the difference $Δα$ between 0 to $ΔαTH$; or $ΔαTH$ (i.e. the bend point of the lines in FIG. 11) is set within a relatively smaller range of the difference $Δα$.

According to the steering control apparatus of the third embodiment, it is possible to change stability and steering response depending on the condition of the vehicle CR.

"Steering response" means a response performance from a time when the steering ST is manipulated by a driver to a time when the vehicle changes its orientation, and also means a ratio between steering amount (input steering angle) of the steering ST and orientation variable of the vehicle body.

The embodiments of the present inventions have been explained in details as described above. However the present invention is not limited to those specific embodiments, and various modifications and changes thereto can be made by persons skilled in the art without departing from the scope and spirit of the invention as set forth in the following claims.

For example, the steered wheels of the vehicle are not limited to front wheels, and may be rear wheels or both the rear and front wheels.

The steering controller 20C of the third embodiment may be constituted such that the vehicle speed calculating unit 29 is omitted, and the lock coefficient setting unit 28 sets a lock coefficient K based on the difference Δα only.

According to the present invention, a steering actuator is eliminated, thereby to provide a steering control apparatus, a steering control system and a steering control program in the SBW scheme, which enhance flexibility of a steering-relevant design.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A steering control apparatus configured to control a steering of a vehicle of a steer-by-wire type, the apparatus comprising:
   steered-wheel motors configured to apply separate torques to right and left steered wheels, respectively;
   a rod member configured to couple the right and left steered wheels to steer the steered wheels; and
   a steering controller configured to control the steered-wheel motors,
   wherein each steered wheel comprises an offset configured between a center of a contact face thereof and a kingpin point thereof in a lateral direction of the vehicle,
   wherein the kingpin point is defined by a straight line through a first joint at which a shock absorber unit and a vehicle body of the vehicle are jointed and a second joint at which the motor and a lower arm are jointed, and is positioned closer to the vehicle on an outside portion of an inboard sidewall of a steered wheel,
   wherein the offset is greater than a distance between the center of the contact face of each steered wheel and the inboard sidewall of the steered wheel, to optimize a generation of steering effort via the rod member,
   wherein the steering controller is further configured to control a driving of the steered-wheel motors to generate a torque difference between the right and left steered wheels, and further configured to provide the steering effort based on the torque difference for each of the right and left steered wheels via the rod member, thereby to steer the vehicle, and
   wherein the right and left steered wheels are configured, when being steered by the rod member, to rotate such that the center of the contact face turns in a circular arc with respect to the kingpin point, wherein the circular arc has a radius which is equal to the offset.

2. A steering control apparatus according to claim 1, wherein each steered-wheel motor is housed in the corresponding steered wheel.

3. A steering control apparatus according to claim 1, wherein the kingpin point is configured inward from the center of the contact face in the lateral direction of the vehicle.

4. A steering control apparatus according to claim 2, wherein the kingpin point is configured inward from the center of the contact face in the lateral direction of the vehicle.

5. A steering control apparatus according to claim 1, further comprising:
   a lock mechanism configured to lock the rod member,
   wherein the steering controller is further configured to control a driving of the lock mechanism to lock or unlock the rod member.

6. A steering control apparatus according to claim 2, further comprising:
   a lock mechanism configured to lock the rod member,
   wherein the steering controller is further configured to control a driving of the lock mechanism to lock or unlock the rod member.

7. A steering control apparatus configured to control a steering of a vehicle of a steer-by-wire type, the apparatus comprising:
   steered-wheel motors configured to apply separate torques to right and left steered wheels, respectively;
   a rod member configured to couple the right and left steered wheels to steer the steered wheels; and
   a steering controller configured to control the steered-wheel motors,
   wherein each steered wheel comprises an offset configured between a center of a contact face thereof and a kingpin point thereof in a lateral direction of the vehicle, to optimize a generation of steering effort via the rod member,
   wherein the kingpin point is defined by a straight line through a first joint at which a shock absorber unit and a vehicle body of the vehicle are jointed and a second joint at which the motor and a lower arm are jointed,
   wherein the steering controller is further configured to control a driving of the steered-wheel motors to generate a torque difference between the right and left steered wheels, and further configured to provide a steering effort based on the torque difference for each of the right and left steered wheels via the rod member, thereby to steer the vehicle, and
   wherein the right and left steered wheels are configured, when being steered by the rod member, to rotate such that the center of the contact face turns in a circular arc with respect to the kingpin point, wherein the circular arc has a radius which is equal to the offset.

8. The steering control apparatus according to claim 7, wherein each steered-wheel motor is housed in the corresponding steered wheel, and wherein the kingpin point is configured inward from the center of the contact face in the lateral direction of the vehicle.

9. A steering control apparatus according to claim 7, further comprising:
   a lock mechanism configured to lock the rod member,
   wherein the steering controller is further configured to control a driving of the lock mechanism to lock or unlock the rod member.

* * * * *